US012766997B2

(12) United States Patent
Wang et al.

(10) Patent No.: US 12,766,997 B2
(45) Date of Patent: Oct. 20, 2026

(54) SYSTEM AND METHOD FOR COORDINATED ENERGY REPLENISHMENT SUMMONING THROUGH PILE-STATION INTEGRATION

(71) Applicant: NIO TECHNOLOGY (ANHUI) CO., LTD, Hefei City (CN)

(72) Inventors: Yifei Wang, Shanghai (CN); Jiyong Zou, Shanghai (CN); Yue Zhu, Shanghai (CN)

(73) Assignee: NIO TECHNOLOGY (ANHUI) CO., LTD, Hefei City (CN)

( * ) Notice: Subject to any disclaimer, the term of this patent is extended or adjusted under 35 U.S.C. 154(b) by 756 days.

(21) Appl. No.: 18/312,679

(22) Filed: May 5, 2023

(65) Prior Publication Data

US 2023/0356620 A1 Nov. 9, 2023

(30) Foreign Application Priority Data

May 6, 2022 (CN) ......................... 202210485354.4

(51) Int. Cl.

*B60L 53/80* (2019.01)
*B60L 53/30* (2019.01)
*B60L 53/66* (2019.01)

(52) U.S. Cl.

CPC ............... *B60L 53/80* (2019.02); *B60L 53/30* (2019.02); *B60L 53/66* (2019.02)

(58) Field of Classification Search

CPC .......... B60L 53/80; B60L 53/30; B60L 53/66; B60L 53/63; B60L 53/65; B60L 53/31;

(Continued)

(56) References Cited

U.S. PATENT DOCUMENTS 9,123,035 B2 * 9/2015 Penilla .................... B60L 50/66
12,090,885 B2 * 9/2024 Li ......................... B60L 53/305

(Continued)

FOREIGN PATENT DOCUMENTS

CN 108099860 A * 6/2018 ............. B60L 58/22
CN 111993947 11/2020

(Continued)

OTHER PUBLICATIONS

CN112455269A Charging and battery replacing combined charging vehicle scheduling system and scheduling method (Machine Translation; (Year: 2021).*

(Continued)

*Primary Examiner* — M Baye Diao
(74) *Attorney, Agent, or Firm* — Sheridan Ross PC

(57) ABSTRACT

The disclosure provides a system and method for coordinated energy replenishment summoning through pile-station integration. The system is applied to a battery swap station, and a charging pile is arranged outside the battery swap station. The system includes: a battery swap summoning unit, an energy replenishment confirmation unit, and a charging summoning unit. The battery swap summoning unit is configured to: arrange a battery swap station for a vehicle to have a battery swapped, and if the arranged battery swap station is capable of meeting battery swap requirements of the vehicle, dispatch a battery swap task to the battery swap station such that the vehicle enters the battery swap station to attempt a battery swap. The energy replenishment confirmation unit is configured to: after the vehicle has attempted a battery swap, determine whether the battery swap for the vehicle is successful; if the battery swap is not successful, further determine whether there is a possibility that the vehicle attempts a battery swap again; if there is a possibility that the vehicle attempts a battery swap (Continued)

again, summon the vehicle to attempt a battery swap again; and if there is no possibility that the vehicle attempts a battery swap again, further determine whether the vehicle meets charging conditions. The charging summoning unit is configured to: if the energy replenishment confirmation unit confirms that the vehicle meets the charging conditions, notify the vehicle to complete energy replenishment by charging at the charging pile.

10 Claims, 4 Drawing Sheets

(58) Field of Classification Search
CPC ...... B60L 53/60; Y02T 10/70; Y02T 10/7072; Y02T 90/12; Y02T 90/16
USPC .......................................................... 320/107
See application file for complete search history.

(56) References Cited

U.S. PATENT DOCUMENTS

| | | | | |
|---|---|---|---|---|
| 12,133,070 | B2 * | 10/2024 | Wu | B60L 53/65 |
| 12,252,030 | B2 * | 3/2025 | Huang | B60L 50/60 |
| 2012/0271723 | A1 * | 10/2012 | Penilla | B60L 50/66<br>705/16 |
| 2020/0001727 | A1 * | 1/2020 | Li | B60L 50/62 |
| 2020/0198494 | A1 * | 6/2020 | Chen | B60K 1/04 |
| 2020/0353838 | A1 * | 11/2020 | Zhang | B60K 1/04 |
| 2021/0309121 | A1 * | 10/2021 | Jain | B60L 53/305 |
| 2021/0399566 | A1 * | 12/2021 | Visvesha | B60L 53/65 |
| 2022/0393491 | A1 * | 12/2022 | Zhang | B60L 53/53 |
| 2023/0064624 | A1 * | 3/2023 | Huang | B60L 3/0046 |
| 2023/0069189 | A1 * | 3/2023 | Li | H04W 4/80 |

FOREIGN PATENT DOCUMENTS

| | | | | |
|---|---|---|---|---|
| CN | 112455269 | | 3/2021 | |
| CN | 112455269 | A * | 3/2021 | B60L 53/80 |
| CN | 114161986 | | 3/2022 | |
| EP | 3725604 | A1 * | 10/2020 | B60L 53/80 |
| WO | WO-2022068100 | A1 * | 4/2022 | B60L 53/80 |

OTHER PUBLICATIONS

B. Bairwa, M. Sarvagya, S. Kumar and A. Banik, "Battery Swapping Mobile Service Station for Electric Vehicles Application," 2021 Second International Conference on Smart Technologies in Computing, Electrical and Electronics (ICSTCEE), Bengaluru, India, 2021, pp. 1-6 (Year: 2021).*
Extended Search Report for European Patent Application No. 23171622.6, dated Aug. 16, 2023, 9 pages.
Official Action with Machine Translation for China Patent Application No. 202210485354.4, dated Nov. 19, 2025, 22 pages.

* cited by examiner

SYSTEM AND METHOD FOR COORDINATED ENERGY REPLENISHMENT SUMMONING THROUGH PILE-STATION INTEGRATION

CROSS-REFERENCE TO RELATED APPLICATIONS

This application claims the benefit of China Patent Application No. 202210485354.4 filed May 6, 2022, the entire contents of which are incorporated herein by reference in its entirety.

TECHNICAL FIELD

The disclosure relates to the field of vehicles, and specifically relates to a system and method for coordinated energy replenishment summoning through pile-station integration.

BACKGROUND

In recent years, with the reduction of petroleum resources and the serious pollution of the atmospheric environment, the development of electric vehicles has become an inevitable trend in the development of the automotive industry. To vigorously develop electric vehicles is an important measure to ensure the energy security in China and achieve sustainable development of the automotive industry.

At present, there are mainly two modes of energy replenishment for a battery electric vehicle, namely, vehicle charging and battery swapping. During charging for the electric vehicle, AC slow charging takes a long time and is limited by a parking place. In contrast, although DC fast charging has a high power and a short charging time, it has a great impact on the grid and further shortens service life of a battery. The battery swap mode allows for orderly charging through interaction with the grid, thereby achieving "peak load regulation and energy storage" for power loads, and improving the overall utilization efficiency of power devices. An electric vehicle can be quickly replenished with energy, thereby shortening the user's waiting time. In addition, the lifespan of the battery is not compromised. Therefore, the battery swap mode is of high promotion value and economic significance in the field of public transportation in the Chinese first-tier cities.

BRIEF SUMMARY

The disclosure provides a system and method for coordinated energy replenishment summoning through pile-station integration. The system and method relate to a battery swap station scenario, especially a scenario in which a charging pile and a battery swap station coexist. By means of a capability of automatic parking of a vehicle in a restricted area, a vehicle to have a battery swapped can autonomously implement a battery swap at a battery swap station, achieving peak-load shifting for the battery swap station, improving a service capacity of the battery swap station, and ensuring persistence and continuity of the service of the battery swap station while ensuring effective energy replenishment for the vehicle to have a battery swapped.

According to a first aspect of the disclosure, a system for coordinated energy replenishment summoning through pile-station integration is provided. The system is applied to a battery swap station, and a charging pile is arranged outside the battery swap station. The system includes: a battery swap summoning unit, an energy replenishment confirmation unit, and a charging summoning unit. The battery swap summoning unit is configured to: arrange a battery swap station for a vehicle to have a battery swapped, and if the arranged battery swap station is capable of meeting battery swap requirements of the vehicle, dispatch a battery swap task to the battery swap station such that the vehicle enters the battery swap station to attempt a battery swap. The energy replenishment confirmation unit is configured to: after the vehicle has attempted a battery swap, determine whether the battery swap for the vehicle is successful; if it is confirmed that the battery swap for the vehicle is not successful, further determine whether there is a possibility that the vehicle attempts a battery swap again; if it is determined that there is a possibility that the vehicle attempts a battery swap again, summon the vehicle to attempt a battery swap again; and if it is determined that there is no possibility that the vehicle attempts a battery swap again, further determine whether the vehicle meets charging conditions. The charging summoning unit is configured to: if the energy replenishment confirmation unit confirms that the vehicle meets the charging conditions, notify the vehicle to complete energy replenishment by charging at the charging pile.

Optionally, according to one or more embodiments of the first aspect, the battery swap summoning unit is further configured to: after dispatching the battery swap task to the battery swap station, determine whether the battery swap station currently meets battery swap conditions; if yes, lock reserved resources of the battery swap station; and if no, wait a time t1 and then redetermine whether the battery swap station currently meets the battery swap conditions; where determining whether the battery swap station currently meets battery swap conditions includes: determining whether the battery swap station supports a type of the vehicle, and determining whether the battery swap station stores a battery compatible with the vehicle; and the reserved resources of the battery swap station include: a reserved parking space of the battery swap station and the battery compatible with the vehicle.

Optionally, according to one or more embodiments of the first aspect, the battery swap summoning unit is further configured to: after locking the reserved resources of the battery swap station, determine whether there is another vehicle currently being serviced at the battery swap station; if yes, summon the vehicle to enter the reserved parking space; and if no, summon the vehicle to enter the battery swap station to attempt a battery swap.

Optionally, according to one or more embodiments of the first aspect, the battery swap summoning unit is further configured to: after the vehicle enters the reserved parking space, determine whether the battery swap station is currently available for a battery swap; if yes, summon the vehicle to enter the battery swap station to attempt a battery swap; and if no, wait a time t2 and then redetermine whether the battery swap station is currently available for a battery swap.

Optionally, according to one or more embodiments of the first aspect, the energy replenishment confirmation unit is further configured to: if it is confirmed that the battery swap for the vehicle is not successful, further summon the vehicle to enter the reserved parking space.

Optionally, according to one or more embodiments of the first aspect, when the energy replenishment confirmation unit confirms that the battery swap for the vehicle is successful or confirms that the vehicle meets the charging conditions, the reserved resources correspondingly locked by the battery swap station are released.

According to a second aspect of the disclosure, a method for coordinated energy replenishment summoning through pile-station integration is provided. The method is applied to a battery swap station, and a charging pile is arranged outside the battery swap station. The method includes: a battery swap summoning step, an energy replenishment confirmation step, and a charging summoning step. The battery swap summoning step includes: arranging a battery swap station for a vehicle to have a battery swapped, and if the arranged battery swap station is capable of meeting battery swap requirements of the vehicle, dispatching a battery swap task to the battery swap station such that the vehicle enters the battery swap station to attempt a battery swap. The energy replenishment confirmation step includes: after the vehicle has attempted a battery swap, determining whether the battery swap for the vehicle is successful; if it is confirmed that the battery swap for the vehicle is not successful, further determining whether there is a possibility that the vehicle attempts a battery swap again; if it is determined that there is a possibility that the vehicle attempts a battery swap again, summoning the vehicle to attempt a battery swap again; and if it is determined that there is no possibility that the vehicle attempts a battery swap again, further determining whether the vehicle meets charging conditions. The charging summoning step includes: if it is confirmed in the energy replenishment confirmation step that the vehicle meets the charging conditions, notifying the vehicle to complete energy replenishment by charging at the charging pile.

Optionally, according to one or more embodiments of the second aspect, the battery swap summoning step further includes: after dispatching the battery swap task to the battery swap station, determining whether the battery swap station currently meets battery swap conditions; if yes, locking reserved resources of the battery swap station; and if no, waiting a time t1 and then redetermining whether the battery swap station currently meets the battery swap conditions; where determining whether the battery swap station currently meets battery swap conditions includes: determining whether the battery swap station supports a type of the vehicle, and determining whether the battery swap station stores a battery compatible with the vehicle; and the reserved resources of the battery swap station include: a reserved parking space of the battery swap station and the battery compatible with the vehicle.

Optionally, according to one or more embodiments of the second aspect, the battery swap summoning step further includes: after locking the reserved resources of the battery swap station, determining whether there is another vehicle currently being serviced at the battery swap station; if yes, summoning the vehicle to enter the reserved parking space; and if no, summoning the vehicle to enter the battery swap station to attempt a battery swap.

Optionally, according to one or more embodiments of the second aspect, the battery swap summoning step further includes: after the vehicle enters the reserved parking space, determining whether the battery swap station is currently available for a battery swap; if yes, summoning the vehicle to enter the battery swap station to attempt a battery swap; and if no, waiting a time t2 and then redetermining whether the battery swap station is currently available for a battery swap.

Optionally, according to one or more embodiments of the second aspect, the energy replenishment confirmation step further includes: if it is confirmed that the battery swap for the vehicle is not successful, further summoning the vehicle to enter the reserved parking space.

Optionally, according to one or more embodiments of the second aspect, when it is confirmed in the energy replenishment confirmation step that the battery swap for the vehicle is successful or that the vehicle meets the charging conditions, the reserved resources correspondingly locked by the battery swap station are released.

According to a third aspect of the disclosure, a battery swap station is provided. The battery swap station includes a system as described in any one of the embodiments in the first aspect of the disclosure.

According to a fourth aspect of the disclosure, a computer storage medium is provided. The computer storage medium includes instructions, and when the instructions are executed, a method as described in any one of the embodiments in the second aspect of the disclosure is performed.

With a growing number of vehicles to have a battery swapped, the battery swap station may be confronted with a sudden influx of users' vehicles for battery swapping, resulting in a reduced service capacity of the battery swap station. The battery swap station of the disclosure allows for a pile-station-integrated energy replenishment scenario, which can serve the energy needs of users more intelligently and conveniently through energy replenishment for vehicles by not only battery swapping but also charging. This achieves a balanced service scenario of the battery swap station, and improves the service capacity of the battery swap station.

DETAILED DESCRIPTION

The disclosure is described below with reference to the flowchart descriptions, the block diagrams, and/or the flowcharts of the method and system according to the embodiments of the disclosure. It will be understood that each block of these flowchart descriptions and/or the block diagrams, and combinations of the flowchart descriptions and/or the block diagrams, can be implemented by computer program instructions. These computer program instructions can be provided to a processor of a general-purpose computer, dedicated computer, or another programmable data processing device to form a machine, so that the instructions executed by the processor of the computer or the another programmable data processing device create components for implementing the functions/operations specified in these flowcharts and/or blocks and/or one or more flow block diagrams.

These computer program instructions may be stored in a computer-readable memory, and the instructions can instruct a computer or another programmable processor to implement the functions in a specific manner, so that the instructions stored in the computer-readable memory generate a manufactured product containing instruction components that implement the functions/operations specified in one or more blocks of the flowcharts and/or the block diagrams.

These computer program instructions may be loaded onto the computer or the further programmable data processor, so that a series of operations and steps are performed on the computer or the further programmable processor, to generate a computer-implemented process. As such, the instructions executed on the computer or the further programmable data processor provide steps for implementing the functions or operations specified in one or more blocks in the flowcharts and/or block diagrams. It should also be noted that in some alternative implementations, the functions/operations shown in the blocks may not occur in the order shown in the flowcharts. For example, two blocks shown in sequence may actually be executed substantially simultaneously or the blocks may sometimes be executed in a reverse order, depending on the functions/operations involved.

A battery swap station 100 and an environment outside the station according to an embodiment of the disclosure will be described below with reference to FIG. 1A, FIG. 1B, and FIG. 1C.

Figure 1A:
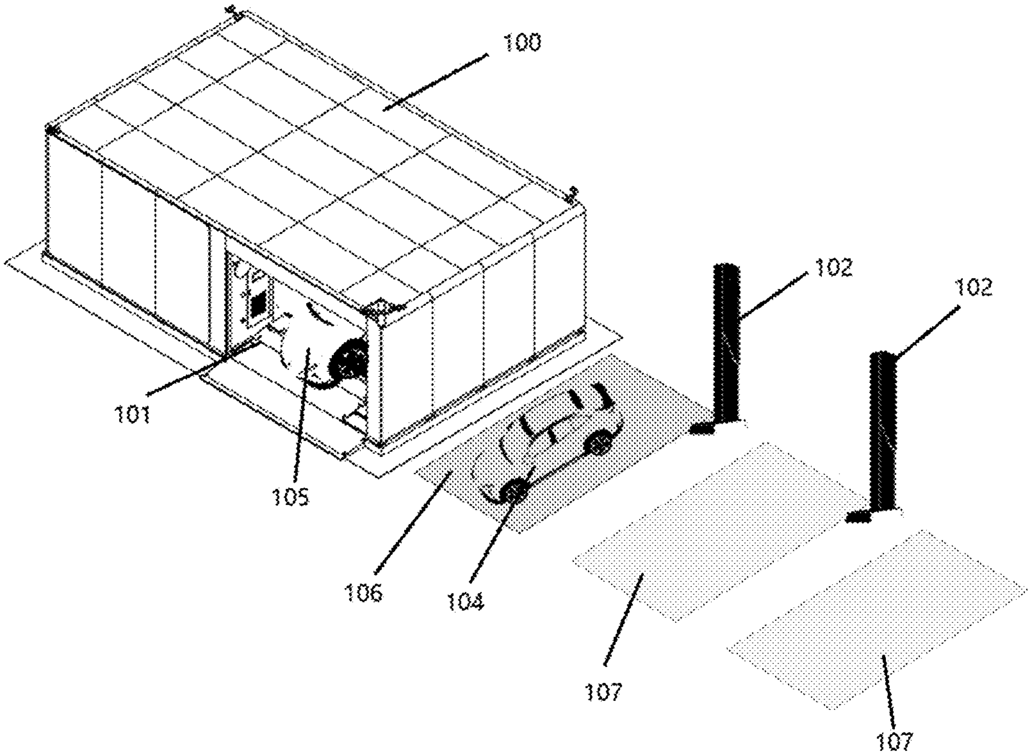
FIG. 1A, FIG. 1B, and FIG. 1C are schematic diagrams of a battery swap station and an external environment thereof according to an embodiment of the disclosure.
Figure 1B:
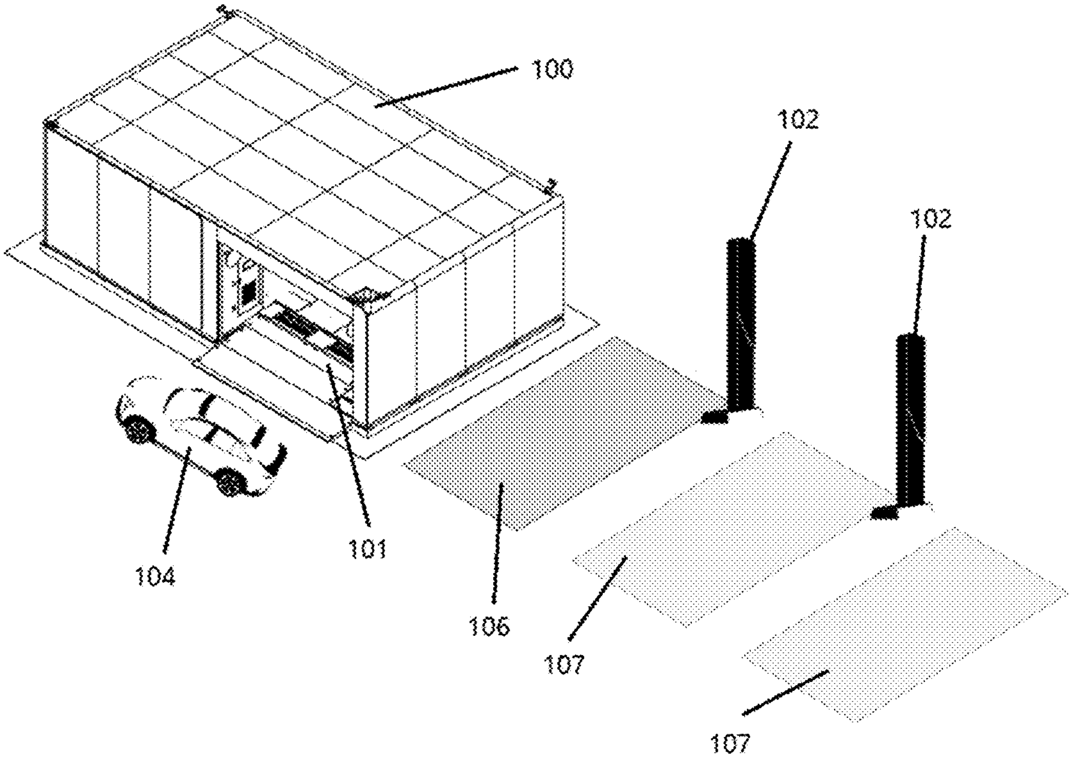
Figure 1C:
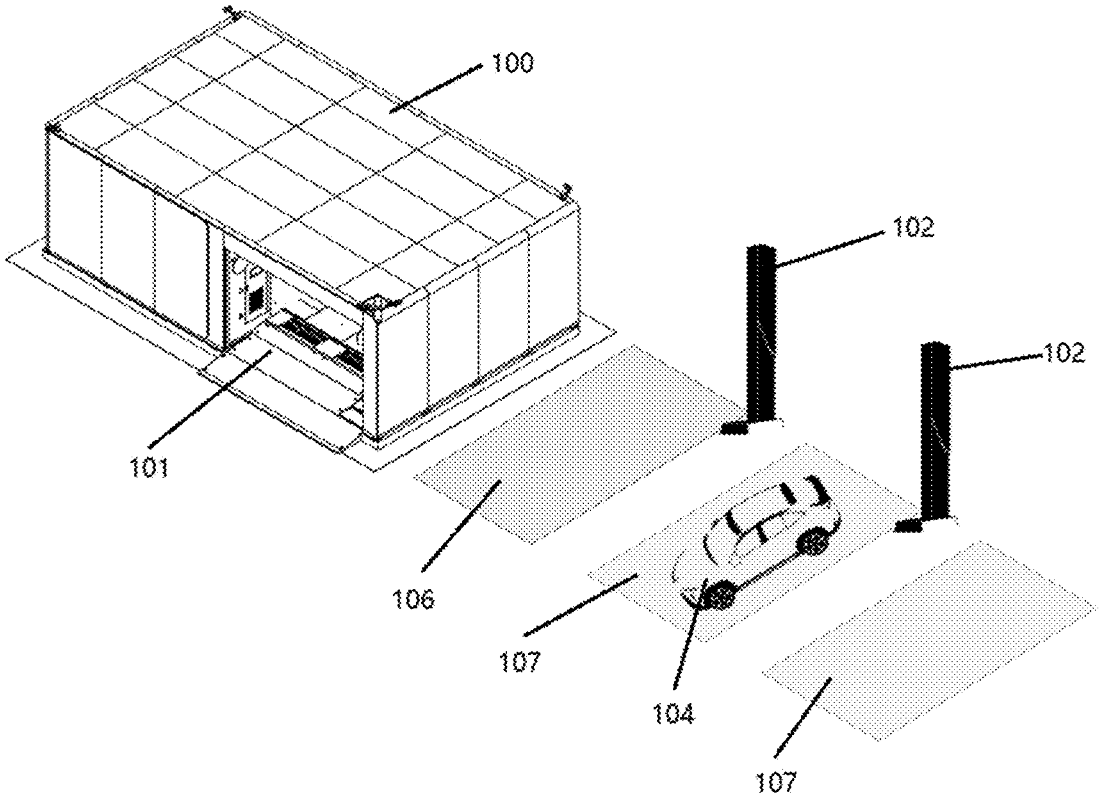

FIG. 1A, FIG. 1B, and FIG. 1C are schematic diagrams of a battery swap station 100 and an external environment thereof according to an embodiment of the disclosure. As shown in FIG. 1A, FIG. 1B, and FIG. 1C, the battery swap station 100 is of a box-like structure, and is used for a vehicle 104 to perform a battery swap operation. An opening is provided at a front wall of the battery swap station 100 to form an entrance 101 of the battery swap station. The opening size of the entrance 101 of the battery swap station is set to be sufficient for the vehicle 104 to enter the internal area of the battery swap station 100, so that when the vehicle 104 needs battery swapping, the vehicle 104 to have a battery swapped can drive from the entrance 101 of the battery swap station to a battery swap area inside the battery swap station 100, to perform a battery swap operation in the battery swap area. A reserved parking space 106 is arranged in an area outside the battery swap station 100 for temporary parking of a vehicle 104 that cannot perform a battery swap currently. It should be noted that the reserved parking space 106 can neither be arranged on a traveling path along which the vehicle drives into the battery swap station 100 from the outside of the battery swap station 100, nor can it be arranged on a traveling path along which the vehicle drives out of the battery swap station 100 from the entrance 101 of the battery swap station. The provision of a location of the reserved parking space 106 can facilitate the smooth traveling of vehicles other than the current vehicle 104 to have a battery swapped. Optionally, as shown in FIG. 1A, FIG. 1B, and FIG. 1C, the reserved parking space 106 is arranged in the right area of the battery swap station 100 away from a path for directly entering and exiting from the entrance 101 of the battery swap station.

A charging pile 102 is arranged outside the battery swap station 100, and a charging space 107 is arranged adjacent to the charging pile 102. Optionally, as shown in FIG. 1A, FIG. 1B, and FIG. 1C, the charging space 107 is located on the right side of the charging pile 102. If the vehicle 104 to have a battery swapped cannot successfully perform a battery swap in the battery swap station 100, the vehicle 104 can drive into the charging space 107 for charging using the charging pile 102. In this embodiment, two charging piles 102 are arranged outside the battery swap station 100, and two charging spaces 107 respectively matching the two charging piles 102 are further arranged. As shown in FIG. 1A, FIG. 1B, and FIG. 1C, the two charging spaces 107 and the one reserved parking space 106 in this embodiment are arranged side by side in an external area beside the battery swap station 100. Optionally, each of the three parking spaces is delineated with markings, as an indication to the vehicle 104 or a driver and a passenger. In other embodiments, another number, such as 1, 3, or 4, of charging piles 102 and a corresponding number of charging spaces 107 may alternatively be arranged outside the battery swap station 100.

FIG. 1A, FIG. 1B, and FIG. 1C respectively show states of the vehicle 104 to have a battery swapped being at different positions outside the battery swap station 100.

In the state shown in FIG. 1A, there is currently another vehicle 105 inside the battery swap station 100, and the vehicle 104 to have a battery swapped that participates in the current energy replenishment cannot directly drive into the battery swap station 100 to perform a battery swap. In this case, the vehicle 104 to have a battery swapped is temporarily parked in the reserved parking space 106.

In the state shown in FIG. 1B, the vehicle 104 is outside the battery swap station 100 and is not far from the entrance 101 of the battery swap station. In this state, the vehicle 104 may be about to enter the battery swap station 100 to perform a battery swap operation, or may be about to leave the battery swap station 100, or may be about to enter the reserved parking space 106, or may be about to enter the charging space 107 for a charging operation using the charging pile 102.

In the state shown in FIG. 1C, the vehicle 104 is in one of the charging spaces 107 outside the battery swap station 100. When the vehicle 104 is at this location, the vehicle 104 can use the charging pile 102 beside the charging space 107 for charging.

The battery swap station 100 of the disclosure includes a system 200 (refer to FIG. 2) for coordinated energy replenishment summoning through pile-station integration. The system 200 can use the above-described pile-station-integrated energy replenishment scenario to perform a method 300 (refer to FIG. 3) for coordinated energy replenishment summoning through pile-station integration, so as to comprehensively and automatically select, based on energy replenishment conditions of the battery swap station 100 and the vehicle 104 to have a battery swapped, a mode of energy replenishment by battery swapping or charging for the vehicle 104 to have a battery swapped.

Next, the system 200 for coordinated energy replenishment summoning through pile-station integration according to an embodiment of the disclosure will be described with reference to FIG. 2.

Figure 2:
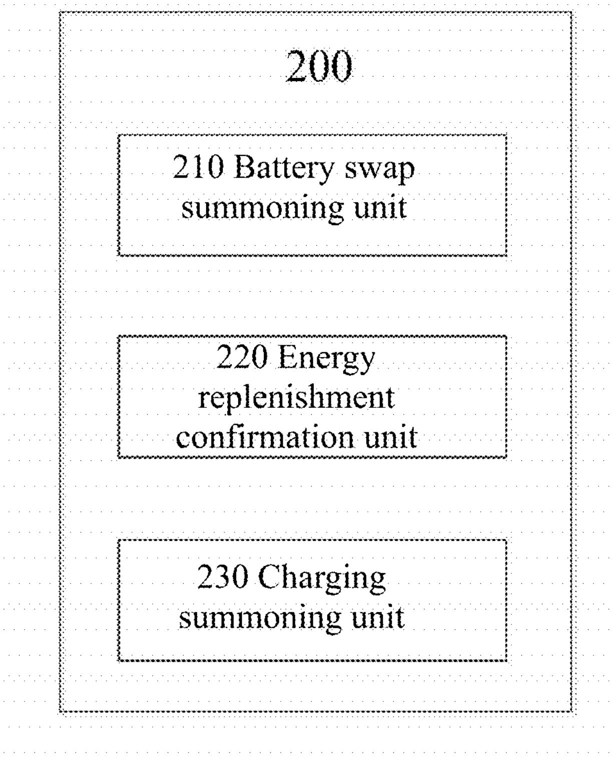
FIG. 2 is a schematic diagram of a system for coordinated energy replenishment summoning through pile-station integration according to an embodiment of the disclosure.

FIG. 2 is a schematic diagram of a system 200 for coordinated energy replenishment summoning through pile-station integration according to an embodiment of the disclosure. As shown in FIG. 2, the system 200 for coordinated energy replenishment summoning through pile-station integration includes: a battery swap summoning unit 210, an energy replenishment confirmation unit 220, and a charging summoning unit 230.

The battery swap summoning unit 210 is configured to: arrange a battery swap station 100 for a vehicle 104 to have a battery swapped, and if the arranged battery swap station 100 is capable of meeting battery swap requirements of the vehicle 104, dispatch a battery swap task to the battery swap station 100 such that the vehicle 104 enters the battery swap station 100 to attempt a battery swap.

Optionally, the battery swap summoning unit 210 is further configured to: after dispatching the battery swap task to the battery swap station 100, determine whether the battery swap station 100 currently meets battery swap conditions. If yes, the battery swap summoning unit locks reserved resources of the battery swap station 100. If no, the battery swap summoning unit waits a time t1 and then redetermines whether the battery swap station 100 currently meets the battery swap conditions. The battery swap summoning unit 210 may determine whether the battery swap station 100 currently meets the battery swap conditions, based on the following determination criteria: whether the battery swap station 100 supports a type of the vehicle 104; and whether the battery swap station 100 stores a battery compatible with the vehicle 104. If the battery swap station 100 meets all the determination conditions, it can be confirmed that the battery swap station 100 currently meets the battery swap conditions. The reserved resources of the battery swap station 100 include a battery for the vehicle 104 to swap and a reserved parking space 106 for the vehicle 104 to temporarily park. In some embodiments, the time t1 may be any time value from 0.5 to 100 minutes. In other embodiments, another appropriate time may also be selected as the waiting time t1.

Optionally, the battery swap summoning unit 210 is further configured to: after locking the reserved resources of the battery swap station 100, determine whether there is another vehicle currently being serviced at the battery swap station 100; if yes, summon the vehicle 104 to enter the reserved parking space 106; and if no, summon the vehicle 104 to enter the battery swap station 100 to attempt a battery swap.

Optionally, the battery swap summoning unit 210 is further configured to: after the vehicle 104 enters the reserved parking space 106, determine whether the battery swap station 100 is currently available for a battery swap; if yes, summon the vehicle 104 to enter the battery swap station 100 to attempt a battery swap; and if no, wait a time t2 and then redetermine whether the battery swap station 100 is currently available for a battery swap. In some embodiments, the time t2 may be any time value from 0.1 to 30 minutes. In other embodiments, another appropriate time may also be selected as the waiting time t2.

The energy replenishment confirmation unit 220 is configured to: after the vehicle 104 has attempted a battery swap, determine whether the battery swap for the vehicle 104 is successful. If it is confirmed that the battery swap for the vehicle 104 is successful, it indicates that the current energy replenishment operation of the vehicle 104 has been completed. Under the condition that the vehicle 104 has completed the current battery swap operation, the system 200 may further release the reserved parking space 106 locked by the battery swap station 100. If it is confirmed that the battery swap for the vehicle 104 is not successful, it is further determined whether there is a possibility that the vehicle 104 attempts a battery swap again; if yes, the vehicle 104 is summoned to attempt a battery swap again; and if no, the vehicle 104 is summoned to enter the reserved parking space 106, and it is further determined whether the vehicle 104 meets charging conditions. In some embodiments, when the energy replenishment confirmation unit 220 confirms that the vehicle 104 meets the charging conditions, the system 200 may release the battery and the reserved parking space 106 that are locked by the battery swap station 100.

The charging summoning unit 230 is configured to: if the energy replenishment confirmation unit 200 confirms that the vehicle 104 meets the charging conditions, notify the vehicle 104 to complete energy replenishment by charging at an idle charging pile 104.

Next, a method 300 for coordinated energy replenishment summoning through pile-station integration according to an embodiment of the disclosure will be described with reference to FIG. 3 and FIG. 4.

Figure 3:
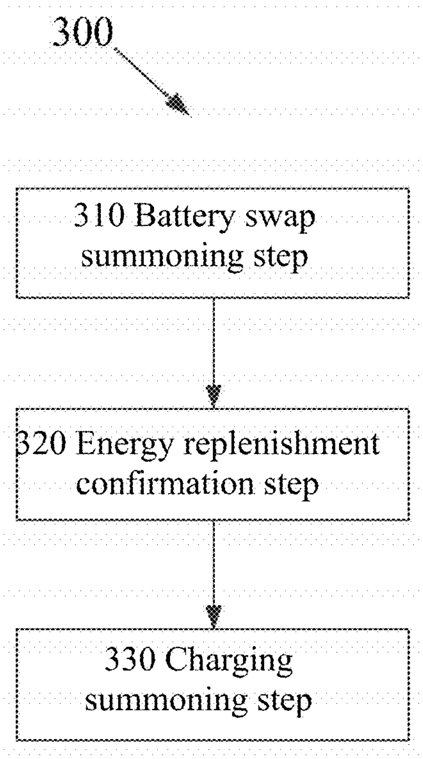
FIG. 3 is a diagram of brief steps of a method for coordinated energy replenishment summoning through pile-station integration according to an embodiment of the disclosure.

FIG. 3 is a diagram of brief steps of a method 300 for coordinated energy replenishment summoning through pile-station integration according to an embodiment of the disclosure. As shown in FIG. 3, the method 300 for coordinated energy replenishment summoning through pile-station integration includes: a battery swap summoning step 310, an energy replenishment confirmation step 320, and a charging summoning step 330. The method 300 for coordinated energy replenishment summoning through pile-station integration depicted in FIG. 3 corresponds to the system 200 for coordinated energy replenishment summoning through pile-station integration depicted in FIG. 2. The battery swap summoning step 310 includes the steps described above for the battery swap summoning unit 210, the energy replenishment confirmation step 320 includes the steps described above for the energy replenishment confirmation unit 220, and the charging summoning step 330 includes the steps described above for the charging summoning unit 230. For brevity, the steps included in the battery swap summoning step 310, the energy replenishment confirmation step 320, and the charging summoning step 330 are not described in detail here.

Figure 4:
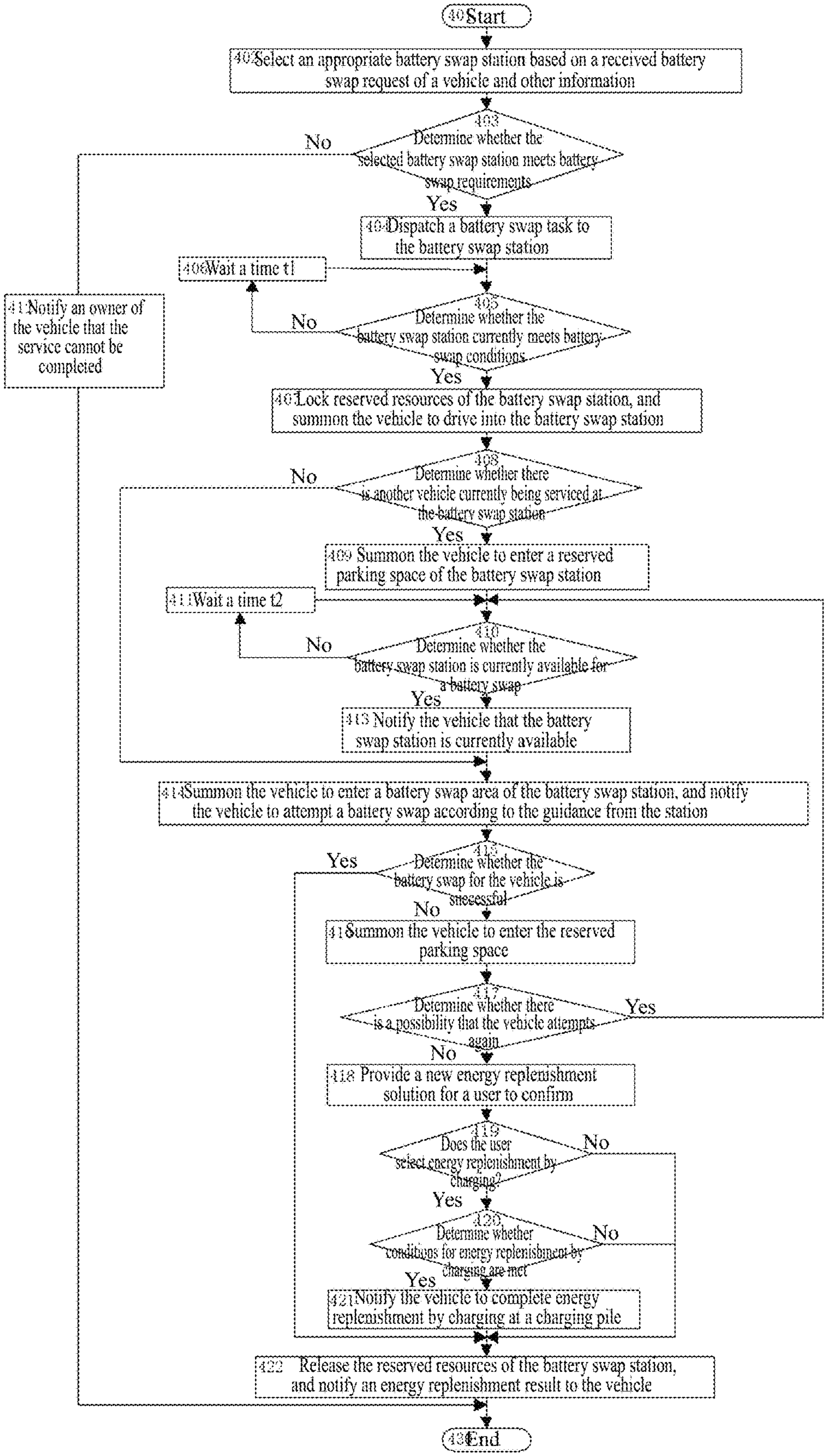
FIG. 4 is a flowchart of a method for coordinated energy replenishment summoning through pile-station integration according to an embodiment of the disclosure.

FIG. 4 is a flowchart of a method 300 for coordinated energy replenishment summoning through pile-station integration according to an embodiment of the disclosure.

In this embodiment, procedures in the method 300 may be implemented by the battery swap summoning unit 210, the energy replenishment confirmation unit 220, and the charging summoning unit 230 in the system 200.

As shown in FIG. 4, once the system 200 receives a battery swap request of a user, the method 300 for coordinated energy replenishment summoning through pile-station integration can enter the start step 401 to confirm a battery swap summoning function. To be specific, when the vehicle 104 needs battery swapping, an owner of the vehicle 104, as a user, can place an order on a cloud, so that the system 200 can receive the battery swap request of the vehicle 104 through the cloud.

After the start step 401, the system 200 may further perform step 402 to select an appropriate battery swap station based on a message about the battery swap request of the vehicle 104 and other messages received from the cloud. In step 402, the system 200 may plan an appropriate battery swap station through the cloud. In some embodiments, the system 200 may select an appropriate battery swap station according to the following selection conditions: a distance between the battery swap station and the vehicle 104; a service status of the battery swap station (for example, the number of orders for the battery swap station and whether the battery swap station is in service); the remaining range of the vehicle 104; and related area restrictions (for example, whether the vehicle 104 is allowed to enter or leave). If a candidate battery swap station can meet all the above selection conditions, the battery swap station may be selected as an appropriate battery swap station. As an example, in this embodiment, the battery swap station 100 shown in FIG. 1A, FIG. 1B, and FIG. 1C is selected as an appropriate battery swap station.

After step 402, the system 200 may further perform step 403 to determine whether the selected battery swap station 100 meets battery swap requirements. In step 403, the system 200 may determine whether the selected battery swap station 100 meets the battery swap requirements, based on the following conditions: whether the selected battery swap station 100 stores a battery model requested by the vehicle 104 to have a battery swapped; and whether the selected battery swap station 100 supports a type of the vehicle 104 to have a battery swapped. If it is confirmed that the selected battery swap station 100 meets all the battery swap requirements of the vehicle 104, step 404 is further performed; otherwise, step 412 is performed.

In step 412, the system 412 may notify the user (the vehicle 104 or the driver and the passenger on the vehicle 104) through the cloud that the battery swap service ordered by the user cannot be completed. In addition, since the selected battery swap station 100 cannot meet the battery swap requirements of the vehicle 104, after step 412, the system 200 may proceed to the end step 430 to end the current service for energy replenishment by battery swapping.

In step 404, the system 200 dispatches a current battery swap task to the selected battery swap station 100. At this point, the battery swap station 100 that has received the battery swap task may accept the task.

After step 404, the system 200 may further perform step 405 to determine whether the battery swap station 100 that accepts the task currently meets battery swap conditions. Optionally, the battery swap conditions being met includes: the battery swap station 100 currently has a battery for the vehicle 104 to swap; and the battery swap station 100 currently has a reserved parking space for the vehicle 104 to use. If it is confirmed that the battery swap station 100 meets all the battery swap conditions, step 407 is performed. If it is confirmed that the battery swap station 100 does not meet all the battery swap conditions, step 406 is performed to wait a time t1 and then return to step 405.

In step 407, the system 200 may first lock reserved resources of the battery swap station 100, and then summon the vehicle 104 to drive into the battery swap station 100 that meets the battery swap conditions. Optionally, the reserved resources include a battery for the vehicle 104 to swap and a reserved parking space 106 for the vehicle 104 to temporarily park, and the system 200 may lock both the battery and the reserved parking space 106. In addition, optionally, the system 200 may send related information of the battery swap station 100 that meets the battery swap conditions to the user (the vehicle 104 or the driver and the passenger of the vehicle 104) through the cloud, so that the vehicle 104 can be headed toward the designated battery swap station 100 according to the received address information of the battery swap station 100.

After step 407, the system 200 may further perform step 408 to determine whether there is another vehicle currently being serviced at the battery swap station 100. If it is determined in step 408 that there is another vehicle currently being serviced at the battery swap station 100, step 409 is further performed. If it is determined in step 408 that there is no other vehicle currently being serviced at the battery swap station 100, step 414 is further performed.

In step 409, the system 200 may summon, through the cloud, the vehicle 104 to have a battery swapped to enter the reserved parking space 106 of the battery swap station 100. At this point, the vehicle 104 to have a battery swapped that has received the notification may be headed toward the reserved parking space 106 of the battery swap station 100 as indicated. For example, FIG. 1A shows a scenario in which the vehicle 104 to have a battery swapped is temporarily parked in the reserved parking space 106 of the battery swap station 100 when another vehicle is currently being serviced at the battery swap station 100.

After step 409, the system 200 further performs step 410 to determine whether the battery swap station 100 is currently available for a battery swap task. If the system 200 determines in step 410 that the battery swap station 100 is currently available for a battery swap, step 413 is further performed. If the system 200 determines that the battery swap station 100 is currently not available for a battery swap, step 411 is further performed to wait a time t2 and then return to step 410.

In step 413, the system 200 may notify the vehicle 104 that the battery swap station 100 is currently available for a battery swap service. After step 413, the system 200 further performs step 414.

In step 414, the system 200 summons the vehicle 104 to have a battery swapped to enter a battery swap area in the battery swap station 100 and notifies the vehicle 104 to attempt a battery swap according to the guidance from the battery swap station. At this point, the vehicle 104 that has received the summoning notification may drive from the reserved parking space 106 to the battery swap area in the battery swap station 100 as indicated, and attempt a battery swap operation according to the guidance from the station. During this process, although the vehicle 104 leaves the reserved parking space 106, the battery swap summoning procedure for the vehicle 104 has not yet ended, and the system 200 keeps the reserved parking space 106 locked for later use by the vehicle 104 in the battery swap summoning procedure as required.

After step 414, the system 200 further performs step 415 to determine whether the battery swap for the vehicle 104 is successful. If it is determined in step 415 that the battery swap for the vehicle 104 is successful, the system 200 further performs step 422. If it is determined in step 415 that the battery swap for the vehicle 104 is not successful, the system 200 further performs step 416.

In step 416, the system 200 summons the vehicle 104 for which the battery swap is not successful to enter the reserved parking space 106. At this point, the vehicle 104 that has received the summon will be headed toward the reserved parking space 106 as indicated, to wait for a subsequent indication.

After step 416, the system 200 further performs step 417 to determine whether there is a possibility that the vehicle 104 attempts again. Optionally, the system 200 may determine whether there is a possibility that the vehicle 104 attempts again, based on the following determination conditions: If the battery swap for the vehicle 104 fails due to the presence of ice and snow on the chassis, a parking failure, and the like, it is determined that there is a possibility that the vehicle 104 attempts again. If the battery swap for the vehicle 104 fails due to the addition of accessories, the vehicle being too high and too wide, and the like, it is determined that there is no possibility that the vehicle 104 attempts again. If it is determined in step 417 that there is a possibility that the vehicle 104 attempts again, return to step 410. If it is determined in step 417 that there is no possibility that the vehicle 104 attempts again, the system 200 may perform step 418.

In step 418, the system 200 may notify the user (the vehicle 104 or the driver and the passenger of the vehicle 104) through the cloud that the energy replenishment by battery swapping cannot be completed, and further provide a new energy replenishment solution for the user to confirm. At this point, the user may provide an acceptable energy replenishment solution to the system 200 as prompted. For example, the user may provide a message on whether to accept energy replenishment by charging.

After step 418, the system 200 may further perform step 419 to determine whether the user selects energy replenishment by charging. If it is determined in step 419 that the user selects energy replenishment by charging, step 420 is further performed. If it is determined in step 419 that the user does not select energy replenishment by charging, step 422 is further performed.

In step 420, the system 200 may further determine through the cloud whether the vehicle 104 meets conditions for energy replenishment by charging. Optionally, the vehicle 104 meeting the determination conditions for energy replenishment by charging includes: both the driver and the passenger of the vehicle 104 and the battery swap station 100 have a sufficient charging time; and there are an idle charging pile 102 and a charging space 107 in the battery swap station 100. If it is determined in step 420 that the vehicle 104 meets all the conditions for energy replenishment by charging, step 421 is further performed. If it is determined in step 420 that the vehicle 104 does not meet all the conditions for energy replenishment by charging, step 422 is further performed.

In step 421, the system 200 notifies the vehicle 104 that meets the conditions for energy replenishment by charging to complete energy replenishment by charging at the charging pile 102. At this point, the vehicle 102 that has received the indication may drive from the reserved parking space 106 to the charging space 107 to complete energy replenishment by charging using the nearby charging pile 102, and then drive away after the charging is completed. Step 422 may be performed after step 421.

In step 422, the system 200 may release the reserved resources locked by the battery swap station 100 in step 407. In some embodiments, if the battery swap for the vehicle 104 is successful, the reserved resource released by the system 200 is the corresponding reserved parking space 106 because the previously locked battery has been swapped into the vehicle 104. If the battery swap for the vehicle 104 is not successful, the reserved resources released by the system 200 are the corresponding battery and the reserved parking space 106. It can be learned from this that whether the reserved parking space 106 is released is not related to whether the vehicle 104 is in the reserved parking space 106, but is related to whether the vehicle 104 completes the battery swap summoning procedure. In addition, in step 422, the system 200 may further notify an energy replenishment result to the vehicle 104 that has completed the current energy replenishment summoning.

After step 422 is performed, the current method 300 for coordinated energy replenishment summoning through pile-station integration ends, and the system 200 enters the end step 430.

The disclosure further provides a computer storage medium including instructions. When the instructions are executed, the method 300 for coordinated energy replenishment summoning through pile-station integration as described above is performed. The computer storage medium mentioned herein includes various types of computer storage media, and may be any usable medium accessible to a general-purpose or special-purpose computer. For example, the computer storage medium may include a RAM, a ROM, an EPROM, an E2PROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor.

The disclosure provides a procedure and method in a scenario of a fully self-service battery swap station (for example, when the station is unattended) for implementing and improving a closed loop of a vehicle leaving the self-service battery swap station, so as to keep the unattended battery swap station in good order while protecting the safety of the vehicle to have a battery swapped and the driver and the passenger, thereby ensuring the operation efficiency of the battery swap station. In an actual application scenario, the disclosure uses edge computing devices and links battery swap stations, vehicles, and the cloud to form an efficient service network. In addition, the disclosure utilizes edge computing devices and uses AI artificial intelligence image reasoning as the entrance to create a complete set of self-service battery swap station procedures mainly based on automatic detection, supplemented by vehicle-station communication, and supported by cloud feedback, forming a vehicle management procedure and method for energy replenishment summoning.

The disclosure implements a procedure of the user placing an order and the battery swap station summoning a battery swap by dispatching the battery swap station and the vehicle through the cloud. In addition, the battery swap station of the disclosure further provides a complete set of procedures and services, which are not only suitable for the scenario of fully self-service battery swap station, but also compatible with the scenario where the battery swap station is attended. In the case of the unattended battery swap station and the unmanned vehicle, the system and method of the disclosure implement automatic parking and automatic energy replenishment of the vehicle in a restricted area by actively guiding the vehicle through the battery swap station and the cloud. The system and method of the disclosure consider a scenario where the vehicle to have a battery swapped and the battery swap station are abnormal, and provide measures to complete a closed loop of procedures, thereby perfecting the energy replenishment operation and achieving self-service.

The system and method for coordinated energy replenishment summoning through pile-station integration of the disclosure are applicable to a pile-station-integrated scenario, and can automatically select a mode of energy replenishment (energy replenishment by battery swapping and energy replenishment by charging) and automatically summon the vehicle for a battery swap through the collaboration of the vehicle, the battery swap station, and the cloud, so as to achieve the active management of vehicles at the battery swap station. The system and method of the disclosure may be oriented to a fully self-service battery swap station, and applicable to a user-free energy replenishment scenario where the battery swap station is unattended and the vehicle is unmanned. This enables frictionless energy replenishment, thereby improving the service efficiency and user experience of the battery swap station.

The embodiments and examples proposed herein are provided in the disclosure to describe as adequately as possible embodiments according to the technology and specific applications thereof and thus enable those skilled in the art to implement and use the disclosure. However, those skilled in the art will know that the above descriptions and examples are provided only for description and illustration. The proposed description is not intended to cover all aspects of the disclosure or limit the disclosure to the disclosed precise forms.

What is claimed is:

1. A system for coordinated energy replenishment summoning through pile-station integration, wherein the system is applied to a battery swap station, and a charging pile is arranged outside the battery swap station, the system comprising:

a battery swap summoning unit configured to: arrange a battery swap station for a vehicle to have a battery swapped, and if the arranged battery swap station is capable of meeting battery swap requirements of the vehicle, dispatch a battery swap task to the battery swap station such that the vehicle enters the battery swap station to attempt a battery swap;

an energy replenishment confirmation unit configured to: after the vehicle has attempted a battery swap, determine whether the battery swap for the vehicle is successful; if it is confirmed that the battery swap for the vehicle is not successful, further determine whether there is a possibility that the vehicle attempts a battery swap again; if it is determined that there is a possibility that the vehicle attempts a battery swap again, summon the vehicle to attempt a battery swap again; and if it is determined that there is no possibility that the vehicle attempts a battery swap again, further determine whether the vehicle meets charging conditions; and a charging summoning unit configured to: if the energy replenishment confirmation unit confirms that the vehicle meets the charging conditions, notify the vehicle to complete energy replenishment by charging at the charging pile, wherein the battery swap summoning unit is further configured to: after dispatching the battery swap task to the battery swap station, determine whether the battery swap station currently meets battery swap conditions; if yes, lock reserved resources of the battery swap station; and if no, wait a time t1 and then redetermine whether the battery swap station currently meets the battery swap conditions;

wherein determining whether the battery swap station currently meets battery swap conditions comprises: determining whether the battery swap station supports a type of the vehicle, and determining whether the battery swap station stores a battery compatible with the vehicle; and the reserved resources of the battery swap station comprise: a reserved parking space of the battery swap station and the battery compatible with the vehicle.

2. The system according to claim 1, wherein the battery swap summoning unit is further configured to: after locking the reserved resources of the battery swap station, determine whether there is another vehicle currently being serviced at the battery swap station; if yes, summon the vehicle to enter the reserved parking space; and if no, summon the vehicle to enter the battery swap station to attempt a battery swap.

3. The system according to claim 2, wherein the battery swap summoning unit is further configured to: after the vehicle enters the reserved parking space, determine whether the battery swap station is currently available for a battery swap; if yes, summon the vehicle to enter the battery swap station to attempt a battery swap; and if no, wait a time t2 and then redetermine whether the battery swap station is currently available for a battery swap.

4. The system according to claim 1, wherein the energy replenishment confirmation unit is further configured to: if it is confirmed that the battery swap for the vehicle is not successful, further summon the vehicle to enter the reserved parking space.

5. The system according to claim 1, wherein when the energy replenishment confirmation unit confirms that the battery swap for the vehicle is successful or confirms that the vehicle meets the charging conditions, the reserved resources correspondingly locked by the battery swap station are released.

6. A method for coordinated energy replenishment summoning through pile-station integration, wherein the method is applied to a battery swap station, and a charging pile is arranged outside the battery swap station, the method comprising:

a battery swap summoning step comprising: arranging a battery swap station for a vehicle to have a battery swapped, and if the arranged battery swap station is capable of meeting battery swap requirements of the vehicle, dispatching a battery swap task to the battery swap station such that the vehicle enters the battery swap station to attempt a battery swap;

an energy replenishment confirmation step comprising: after the vehicle has attempted a battery swap, determining whether the battery swap for the vehicle is successful; if it is confirmed that the battery swap for the vehicle is not successful, further determining whether there is a possibility that the vehicle attempts a battery swap again; if it is determined that there is a possibility that the vehicle attempts a battery swap again, summoning the vehicle to attempt a battery swap again; and if it is determined that there is no possibility that the vehicle attempts a battery swap again, further determining whether the vehicle meets charging conditions; and a charging summoning step comprising: if it is confirmed in the energy replenishment confirmation step that the vehicle meets the charging conditions, notifying the vehicle to complete energy replenishment by charging at the charging pile, wherein the battery swap summoning step further comprises: after dispatching the battery swap task to the battery swap station, determining whether the battery swap station currently meets battery swap conditions; if yes, locking reserved resources of the battery swap station; and if no, waiting a time t1 and then redetermining whether the battery swap station currently meets the battery swap conditions;

wherein determining whether the battery swap station currently meets battery swap conditions comprises: determining whether the battery swap station supports a type of the vehicle, and determining whether the battery swap station stores a battery compatible with the vehicle; and the reserved resources of the battery swap station comprise: a reserved parking space of the battery swap station and the battery compatible with the vehicle.

7. The method according to claim 6, wherein the battery swap summoning step further comprises: after locking the reserved resources of the battery swap station, determining whether there is another vehicle currently being serviced at the battery swap station; if yes, summoning the vehicle to enter the reserved parking space; and if no, summoning the vehicle to enter the battery swap station to attempt a battery swap.

8. The method according to claim 7, wherein the battery swap summoning step further comprises: after the vehicle enters the reserved parking space, determining whether the battery swap station is currently available for a battery swap; if yes, summoning the vehicle to enter the battery swap station to attempt a battery swap; and if no, waiting a time t2 and then redetermining whether the battery swap station is currently available for a battery swap.

9. The method according to claim 6, wherein the energy replenishment confirmation step further comprises: if it is confirmed that the battery swap for the vehicle is not successful, further summoning the vehicle to enter the reserved parking space.

10. The method according to claim 6, wherein when it is confirmed in the energy replenishment confirmation step that the battery swap for the vehicle is successful or that the vehicle meets the charging conditions, the reserved resources correspondingly locked by the battery swap station are released.

* * * * *